(12) United States Patent
Chen et al.

(10) Patent No.: US 12,164,763 B1
(45) Date of Patent: Dec. 10, 2024

(54) SCREEN SPLIT CONTROL METHOD AND APPARATUS, AND STORAGE MEDIUM

(71) Applicant: Beijing Xiaomi Mobile Software Co., Ltd., Beijing (CN)

(72) Inventors: Xinyu Chen, Beijing (CN); Yong Zhang, Beijing (CN); Linnan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/162,515

(22) Filed: Jan. 31, 2023

(30) Foreign Application Priority Data

Oct. 31, 2022 (CN) .......................... 202211348832.3

(51) Int. Cl.
| | |
|---|---|
| *G06F 3/01* | (2006.01) |
| *G06F 3/02* | (2006.01) |
| *G06F 3/0354* | (2013.01) |
| *G06F 3/0481* | (2022.01) |
| *G06F 3/04886* | (2022.01) |

(52) U.S. Cl.
CPC ........ *G06F 3/04886* (2013.01); *G06F 3/0202* (2013.01); *G06F 3/03545* (2013.01); *G06F 3/0481* (2013.01); *G06F 2203/04803* (2013.01)

(58) Field of Classification Search
CPC ............... G06F 3/04886; G06F 3/0202; G06F 3/03545; G06F 3/0481; G06F 2203/04803; G06F 3/04; G06F 3/01
See application file for complete search history.

(56) References Cited

U.S. PATENT DOCUMENTS

| | | | | |
|---|---|---|---|---|
| 9,459,794 | B1* | 10/2016 | Soegiono | .............. G06F 3/0486 |
| 2007/0180400 | A1* | 8/2007 | Zotov | .................. G06F 3/04845 |
| | | | | 715/788 |
| 2010/0079392 | A1* | 4/2010 | Chiang | ............... G06F 3/04886 |
| | | | | 715/788 |
| 2012/0176322 | A1 | 7/2012 | Karmi et al. | |
| 2015/0067579 | A1* | 3/2015 | Jeong | ..................... G06F 3/0481 |
| | | | | 715/781 |
| 2019/0369865 | A1* | 12/2019 | Xia | ...................... G06F 3/03545 |

FOREIGN PATENT DOCUMENTS

| | | |
|---|---|---|
| AU | 2013356799 A1 | 5/2015 |
| CN | 104035704 A | 9/2014 |
| CN | 114637422 A | 6/2022 |

\* cited by examiner

*Primary Examiner* — Lunyi Lao
*Assistant Examiner* — Jarurat Suteerawongsa
(74) *Attorney, Agent, or Firm* — McCoy Russell LLP

(57) ABSTRACT

A screen split control method is performed by a terminal that has a function of responding to a control instruction triggered by a stylus. The screen split control method includes: creating a window in response to receiving the control instruction triggered by the stylus and determining that the control instruction is a control instruction of triggering screen split, where the window is configured to intercept a non-stylus touch event and detect a stylus touch event; determining a screen split position of the terminal based on the stylus touch event detected by the window; and performing screen split on the terminal based on the screen split position.

12 Claims, 12 Drawing Sheets

SCREEN SPLIT CONTROL METHOD AND APPARATUS, AND STORAGE MEDIUM

CROSS REFERENCE TO RELATED APPLICATION

The present application claims the benefit of priority to Chinese Application No. 202211348832.3, filed on Oct. 31, 2022, the contents of which are incorporated herein by reference in their entireties for all purposes.

BACKGROUND

A stylus, together with physical keys, can realize various functions on a terminal, such as Page Up and Page Down, which can improve a convenient degree of a user in using the terminal and facilitate the user to control the terminal to execute corresponding instructions.

SUMMARY

The disclosure relates to the field of control, in particular to a screen split control method and apparatus, and a storage medium.

According to a first aspect of an example of the disclosure, a screen split control method is provided and performed by a terminal. The terminal has a function of responding to a control instruction triggered by a stylus, and the screen split control method includes:

creating a window in response to receiving the control instruction triggered by the stylus and determining that the control instruction is a control instruction of triggering screen split, where the window is configured to intercept a non-stylus touch event and detect a stylus touch event;

determining a screen split position of the terminal based on the stylus touch event detected by the window; and performing screen split on the terminal based on the screen split position.

According to a second aspect of an example of the disclosure, a screen split control apparatus is provided, including:

a processor; and a memory for storing processor executable instructions; where the processor, when executing the instructions, is configured to: execute the method described in the first aspect.

According to a third aspect of an example of the disclosure, a non-transitory computer readable storage medium is provided. The storage medium stores instructions, and the instructions in the storage medium, when executed by a processor of a terminal, cause the terminal to be capable of executing the method described in the first aspect or any implementation of the first aspect.

It needs to be understood that the above general description and the following detailed description are merely for examples and explanatory, and cannot limit the disclosure.

BRIEF DESCRIPTION OF THE DRAWINGS

Accompanying drawings here, which are incorporated in and constitute a part of this specification, illustrate examples consistent with the disclosure and together with the specification, serve to explain the principles of the disclosure.

DETAILED DESCRIPTION

Figure 1:
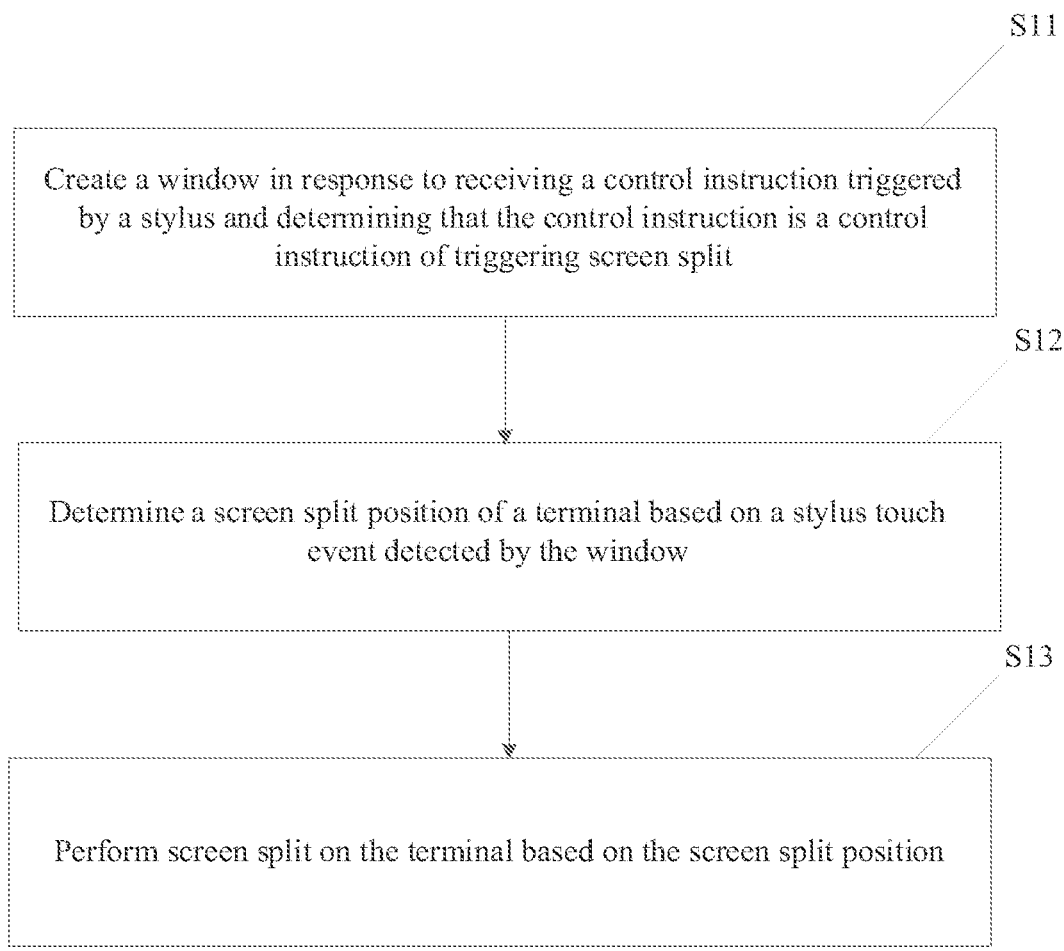
FIG. 1 is a flow diagram of a screen split control method shown according to an example.

Examples will be illustrated in detail here, and instances of which are represented in accompanying drawings. When the following description refers to the accompanying drawings, the same number in the different accompanying drawings represents the same or similar elements unless otherwise indicated. The implementations described in the following examples do not represent all implementations consistent with the disclosure.

An example of the disclosure provides a screen split control method, performed by a scenario of a terminal having a function of responding to a control instruction triggered by a stylus. The terminal may be a tablet computer.

In the related art, the stylus is matched with physical keys. According to different configurations, the physical keys can realize different functions. For example, some styluses are provided with keys of Page Up and Page Down, which can realize operations of page up and down, so that a user can conveniently control the terminal through the styluses. However, the physical keys can merely realize functions like Page Up and Page Down, which are relatively simple.

In the related art, a user interface of displaying different applications on a terminal screen in split screen can meet needs of the user to view and operate the different applications at the same time, and it is possible to slide from a top of the screen of the terminal to a specified position through two fingers to enter into the split screen mode of the terminal. However, there will be some mistaken touch problems depending on the user's finger operation alone. For example, the user will also use two fingers when using some application programs. At this time, a split screen will appear on the terminal, which is not what the user expects. Triggering an instruction that do not match user expectation, resulting in poor experience of the user with the application program. When the terminal and the stylus run at the same time, the user still needs to control the terminal screen through fingers to enter into the screen split mode, which is cumbersome in operation and affects user experience.

In view of this, an example of the disclosure provides a screen split control method, performed by a terminal having a function of responding to a control instruction triggered by a stylus. The terminal creates a window that is used to intercept a non-stylus touch event and can further detect a stylus touch event in response to receiving the control instruction triggered by the stylus and in response to determining that the control instruction is a control instruction of triggering screen split. The terminal determines a screen split position of the terminal based on the stylus touch event detected by the window, and performs screen split on the terminal. Screen split can be triggered merely when the stylus triggers the control instruction of the terminal, which can greatly reduce mistaken touch and meanwhile reduce an operation of triggering screen split, thus improving use experience of the user.

FIG. 1 is a flow diagram of a screen split control method shown according to an example. As shown in FIG. 1, the method is performed by a terminal. The terminal has a function of responding to a control instruction triggered by a stylus. The method includes the following steps.

In step S11, a window is created in response to receiving the control instruction triggered by the stylus, and determining that the control instruction is a control instruction of triggering screen split.

In step S12, a screen split position of the terminal is determined based on a stylus touch event detected by the window.

In step S13, screen split is performed on the terminal based on the screen split position.

The window is configured to intercept a non-stylus touch event and detect the stylus touch event.

In the example of the disclosure, the terminal judges whether the touch instruction of the stylus is the control instruction of triggering screen split. If the control instruction is the control instruction of triggering screen split, the window used to intercept the non-stylus touch event and detect the stylus touch event is created. The touch event described in this disclosure, for example, can refer to the action represented by the MotionEvent object in Android. The screen split position of the terminal is determined based on the stylus touch event detected by the window, and screen split is performed on the terminal at the screen split position.

In the example of the disclosure, the control instruction triggered by the stylus may be a control instruction triggered by any key preset by the stylus, for example, a control instruction triggered by pressing a Page Down key or a Page Up key of the stylus for a long time. The window may be a WindowsManger.addView system level window.

Through the screen split control method provided by the example of the disclosure, one window used to intercept the non-stylus touch event and detect the stylus touch event can be added at the overall system level of the terminal. Compared with triggering screen split through a user gesture, the situation that adding of a global gesture monitor to the system causes frequent call to system resources is avoided. Thus, consumption of calling the system resources is reduced, the control instruction of screen split is triggered through the stylus, and mistaken touch of the user is avoided at the same time.

The screen split control method provided by the example of the disclosure determines the screen split position of the terminal through the stylus. When the stylus triggers the control instruction of screen split, it can be triggered through the key of the stylus.

Figure 2:
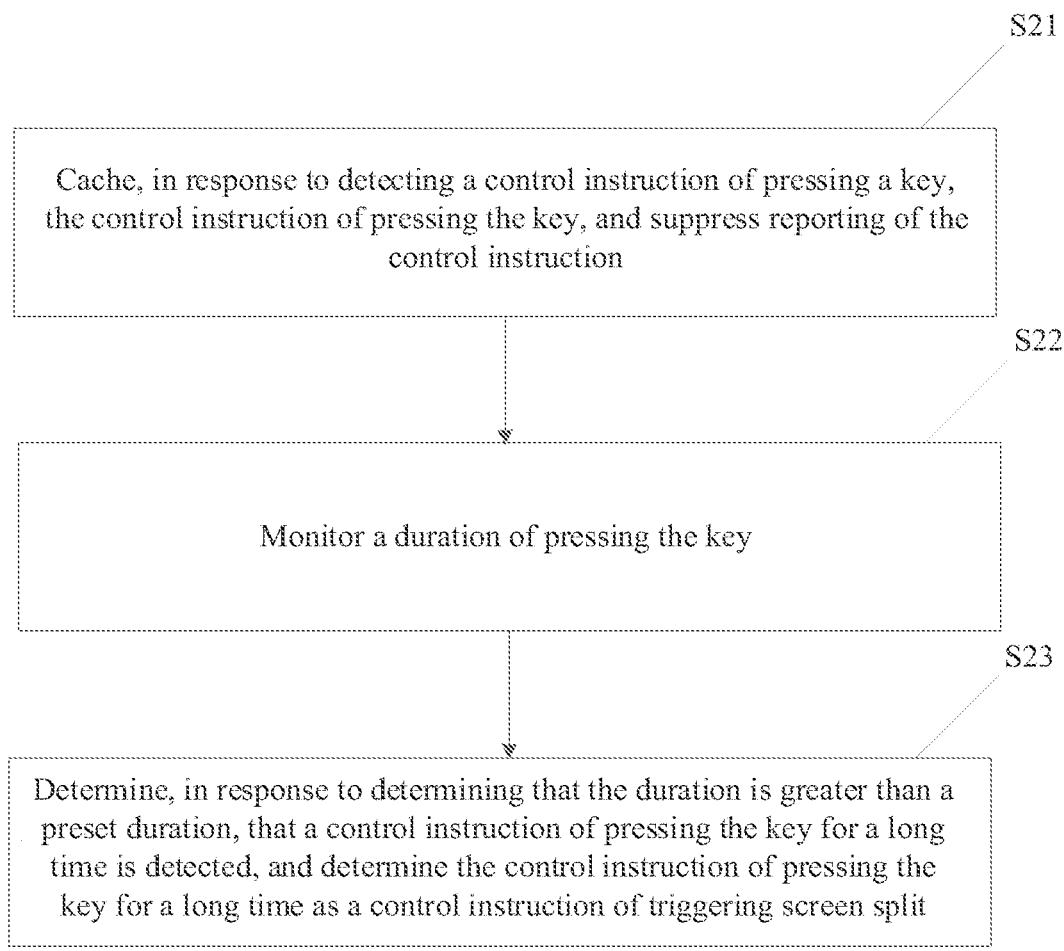
FIG. 2 is a flow diagram of a method for determining that a control instruction is a control instruction for triggering screen split shown according to an example.

FIG. 2 is a flow diagram of a method for determining that the control instruction is the control instruction for triggering screen split shown according to an example. As shown in FIG. 2, the stylus includes a key, and determining that the control instruction is the control instruction of triggering screen split includes the following steps.

In step S21, in response to detecting a control instruction of pressing the key, the control instruction of pressing the key is cached, and reporting of the control instruction is suppressed.

In step S22, a duration of pressing the key is monitored.

In step S23, in response to determining that the duration is greater than a preset duration, it is determined that a control instruction of pressing the key for a long time is detected, and the control instruction of pressing the key for a long time is determined as the control instruction of triggering screen split.

In the example of the disclosure, the stylus includes the key. In a case that the terminal detects that the stylus presses the key, the control instruction sent by the key is cached, and the reporting of the control instruction is suppressed. The control instruction of the key of the stylus is continuously detected, and the duration of pressing the key of the stylus is monitored. If the duration is greater than the preset duration, the control instruction of pressing the key of the stylus for a long time is determined, and the control instruction of pressing the key for a long time is determined as the control instruction of triggering screen split. The window is added to the system of the terminal to determine the screen split position of the terminal, and an original control instruction of the key is deleted, so that the terminal executes the control instruction of screen split and does not execute the original control instruction. If the duration is less than the preset duration, it is determined that the key of the stylus executes the original control instruction, control of the original control instruction is executed on the terminal.

In one example, taking an example that the stylus presses the Page Down key for a long time to trigger the control instruction of screen split and the preset duration is 300 ms (time unit, milliseconds), if the control instruction sent by the Page Down is detected, the Page Down instruction is cached, the reporting of the Page Down instruction is suppressed, and the duration of pressing the Page Down is monitored. If the duration exceeds 300 ms, it is determined that the Page Down key is triggered to be pressed for a long time to execute the instruction of screen split, and the page down instruction is deleted without executing an instruction of Page Down. If it is monitored that the duration of pressing the key is less than 300 ms, the Page Down instruction is triggered, and the terminal controls to turn the page down.

Through the screen split control method provided by the example of the disclosure, the duration of pressing the key of the stylus can be monitored, so as to distinguish a long press or click event of the key of the stylus, and prevent instruction conflict, thus realizing different control instructions of the key of the stylus on the terminal, and improving the use experience of the user.

In the screen split control method provided by the example of the disclosure, long pressing of the key of the stylus is determined to trigger the screen split control of the terminal, and the screen split position of the terminal further needs to be determined.

Figure 3:
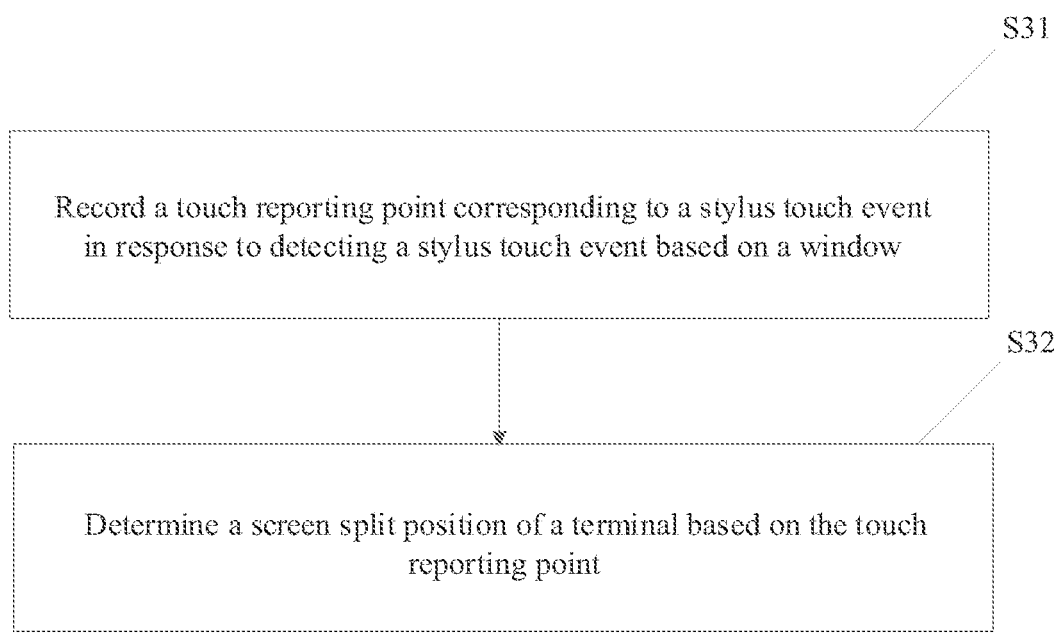
FIG. 3 is a flow diagram of a method for determining a screen split position of a terminal shown according to an example.

FIG. 3 is a flow diagram of a method for determining the screen split position of the terminal shown according to an example. As shown in FIG. 3, determining the screen split position of the terminal based on the stylus touch event detected by the window includes the following steps.

In step S31, a touch reporting point corresponding to the stylus touch event is recorded in response to detecting the stylus touch event based on the window.

In step S32, the screen split position of the terminal is determined based on the touch reporting point.

In the example of the disclosure, a touch reporting point corresponding to the stylus touch event is recorded in response to detecting the stylus touch event by the window and determining it as the control instruction of screen split. The reporting point of screen split control triggered by the stylus is taken as a start reporting point and recorded until the stylus is lifted from the terminal screen or the stylus triggers to end the touch event. During this period, the reporting point of the stylus is the reporting point corresponding to the touch event. The screen split position of the terminal is determined based on the touch reporting point.

In another example, the terminal records the touch reporting point corresponding to the touch event, and directly determines the screen split position according to the position of the touch reporting point.

After the window is created, if a gesture instruction of the user is detected, the gesture instruction is not processed.

Through the screen split control method provided by the example of the disclosure, the user can control the position of the stylus to determine the screen split position of the terminal, so that the screen split position of the terminal meets the needs of the user and improve the use experience of the user.

In the screen split control method provided by the example of the disclosure, the screen split position of the terminal can be determined according to the touch reporting point. In one implementation, the stylus slides on the terminal screen to form a sliding track so as to determine the screen split position of the terminal.

Figure 4:
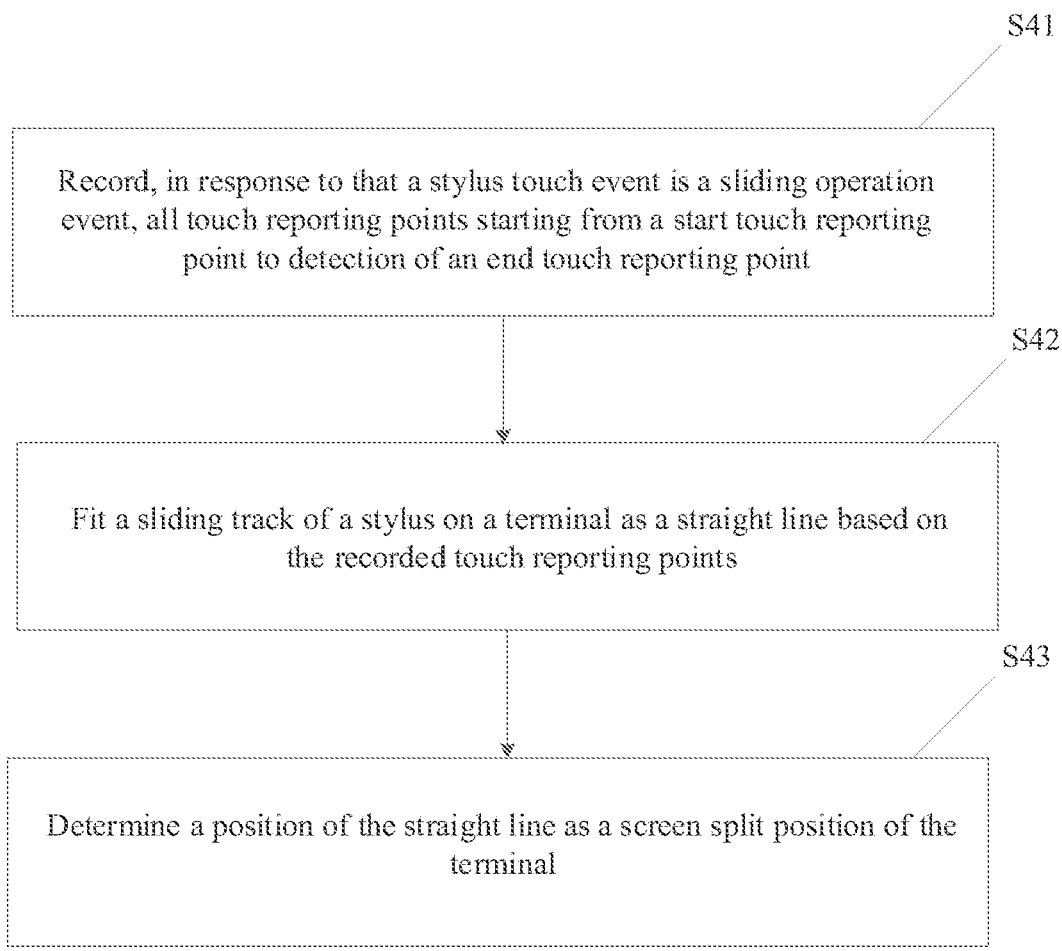
FIG. 4 is a flow diagram of a method for determining a screen split position of a terminal shown according to an example.

FIG. 4 is a flow diagram of a method for determining the screen split position of the terminal shown according to an example. As shown in FIG. 4, determining the screen split position of the terminal based on the touch reporting point includes the following steps.

In step S41, in response to that the stylus touch event is a sliding operation event, all touch reporting points starting from a start touch reporting point to detection of an end touch reporting point are recorded.

In step S42, a sliding track of the stylus on the terminal is fit as a straight line based on the recorded touch reporting points.

In step S43, the position of the straight line is determined as the screen split position of the terminal.

In the example of the disclosure, if it is detected that the stylus slides on the terminal screen, it is determined that the touch event is the sliding operation event, and the touch reporting point that triggers the touch event is taken as the start touch reporting point and recorded until the end touch reporting point is detected. During this period, all the points that the stylus passes through are taken as the touch reporting points. The touch reporting points are fit as the sliding track of the stylus on the terminal, and a fitting result is the straight line. The position of the straight line is determined as the screen split position of the terminal, and the terminal executes the screen split instruction according to the screen split position.

The end touch reporting point is determined by an end touch instruction. The end touch instruction may be that it is detected that the stylus is lifted on the terminal, or that the key of the stylus is not in a state of being pressed, and then the end touch reporting point is considered to be detected.

Through the screen split control method provided by the example of the disclosure, the user can determine the screen split position of the terminal by sliding the stylus on the terminal, so that the user can determine the screen split position according to their needs, thus improving the use experience and efficiency.

The screen split control method provided by the example of the disclosure can determine the screen split position of the terminal according to the sliding track of the stylus on the terminal. The sliding track needs to be fit, and the fitting result is the straight line.

Figure 5:
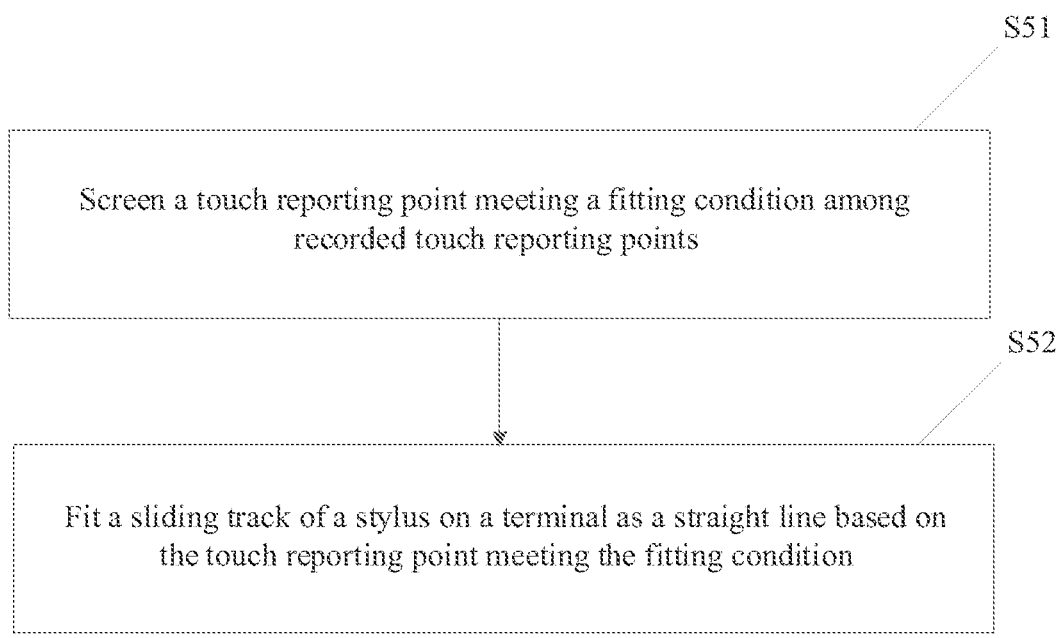
FIG. 5 is a flow diagram of a method for fitting a sliding track of a stylus on a terminal as a straight line shown according to an example.

FIG. 5 is a flow diagram of a method for fitting the sliding track of the stylus on the terminal as the straight line shown according to an example. As shown in FIG. 5, fitting the sliding track of the stylus on the terminal as the straight line based on the recorded touch reporting points includes the following steps.

In step S51, a touch reporting point meeting a fitting condition is screened among the recorded touch reporting points.

In step S52, the sliding track of the stylus on the terminal is fit as the straight line based on the touch reporting point meeting the fitting condition.

In the example of the disclosure, the touch reporting point meeting the fitting condition includes that an absolute value of a difference value between a first target coordinate and a first target coordinate of the start touch reporting point is less than a threshold value, and a second target coordinate and a second target coordinate of the start touch reporting point meet an increasing or decreasing change relationship.

The first target coordinate is an abscissa, the second target coordinate is an ordinate, or the first target coordinate is the ordinate, and the second target coordinate is the abscissa.

The threshold value is used to prevent jitter. If the fitting condition is met, the touch reporting points can be fit as the straight line, and the terminal performs screen split according to the fit straight line.

In an example, taking the touch reporting point being Point (x, y), an upper left corner of the screen being a coordinate origin (0, 0), the threshold value being 200 pixels, and x being 1000 pixels as an example, a reporting point Point (x, y) of handwriting crossed by the stylus on the screen of the terminal is recorded, and when the stylus is lifted from the terminal screen or the key of the stylus is lifted, the sliding track of the stylus starts to be calculated. Taking the touch reporting point that triggers the touch event as the start touch reporting point, it is determined that the start touch reporting point x is 1000 pixels and y is 0 pixel, the recorded touch reporting points are judged, y value being increasing and the absolute value of the difference value between the x coordinate of the corresponding pixel touch reporting point and 1000 being less than 200 pixels are selected to screen all the touch reporting points meeting the fitting condition for fitting, and the fitting result is the straight line.

Through the screen split control method provided by the example of the disclosure, the sliding track of the stylus is fit to prevent jitter, and the screen split position of the terminal is determined, which improves accuracy of the screen split position of the terminal.

In the example of the disclosure, the start touch reporting point is a reporting point within a set distance from an edge of the terminal screen.

In one example, taking the set distance of 50 pixels as an example, it is determined that when the stylus presses the terminal screen, the touch reporting point is within 50 pixels of the screen edge, and the sliding track of the stylus starts to be detected and calculated. For example, in Android, the pressing operation of the stylus on the terminal screen can be determined according to the value of MotionEvent. Action Down.

Through the screen split control method provided by the example of the disclosure, the sliding track of the stylus can be detected accurately.

Figure 6:
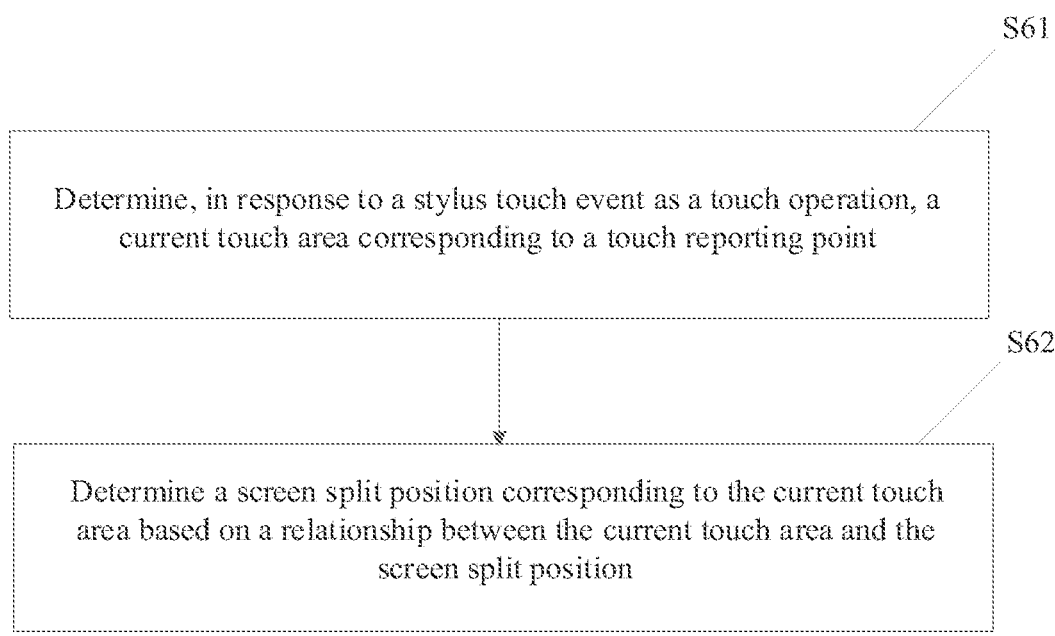
FIG. 6 is a flow diagram of a method for determining a screen split position of a terminal shown according to an example.

FIG. 6 is a flow diagram of a method for determining the screen split position of the terminal shown according to an example. As shown in FIG. 6, determining the screen split position of the terminal based on the touch reporting point includes the following steps.

In step S61, a current touch area corresponding to the touch reporting point is determined in response to the stylus touch event as a touch operation.

In step S62, a screen split position corresponding to the current touch area is determined based on a relationship between the current touch area and the screen split position.

In the example of the disclosure, if the touch event is detected, but there is no sliding track of the stylus, it is determined that the touch event is the touch operation, and the current touch area corresponding to the touch reporting point is determined. The screen split position corresponding to the current touch area is determined based on a relationship between the touch area and the screen split position.

The relationship between the touch area and the screen split position may be that the screen of the terminal is divided into four areas: upper, lower, left and right, and the touch reporting point is determined to be located in upper left, lower left, upper right and lower right areas according to coordinates of the touch reporting point. If the touch area where the touch reporting point is located is upper left or upper right, left-right screen split/up-down screen split is performed. If the touch area where the touch reporting point is located is lower left or lower right, up-down screen split/left-right screen split is performed.

A one-to-one correspondence between the touch area and the screen split position is preset. In the example of the disclosure, the one-to-one correspondence between any touch area and the screen split position can be realized.

Through the screen split control method provided by the example of the disclosure, the screen split area can be determined according to the touch reporting point of the stylus on the terminal screen, so as to perform screen split and improve the convenient degree of the screen split operation of the user.

In the example of the disclosure, the screen split position includes a screen split position for up-down screen split, and/or a screen split position for left-right screen split.

In the example of the disclosure, a function corresponding to the control instruction of pressing the key is prohibited from being triggered.

In the example of the disclosure, the window is removed in response to detecting a control instruction of non-triggering screen split. Thus the terminal can execute the control instruction triggered by an original stylus without conflicting with the original control instruction, meanwhile, global system event monitoring is reduced, power consumption is reduced, and system stability is improved.

In the example of the disclosure, an animation matching the screen split position is displayed according to the screen split position, to improve the use experience of the user.

Figure 7:
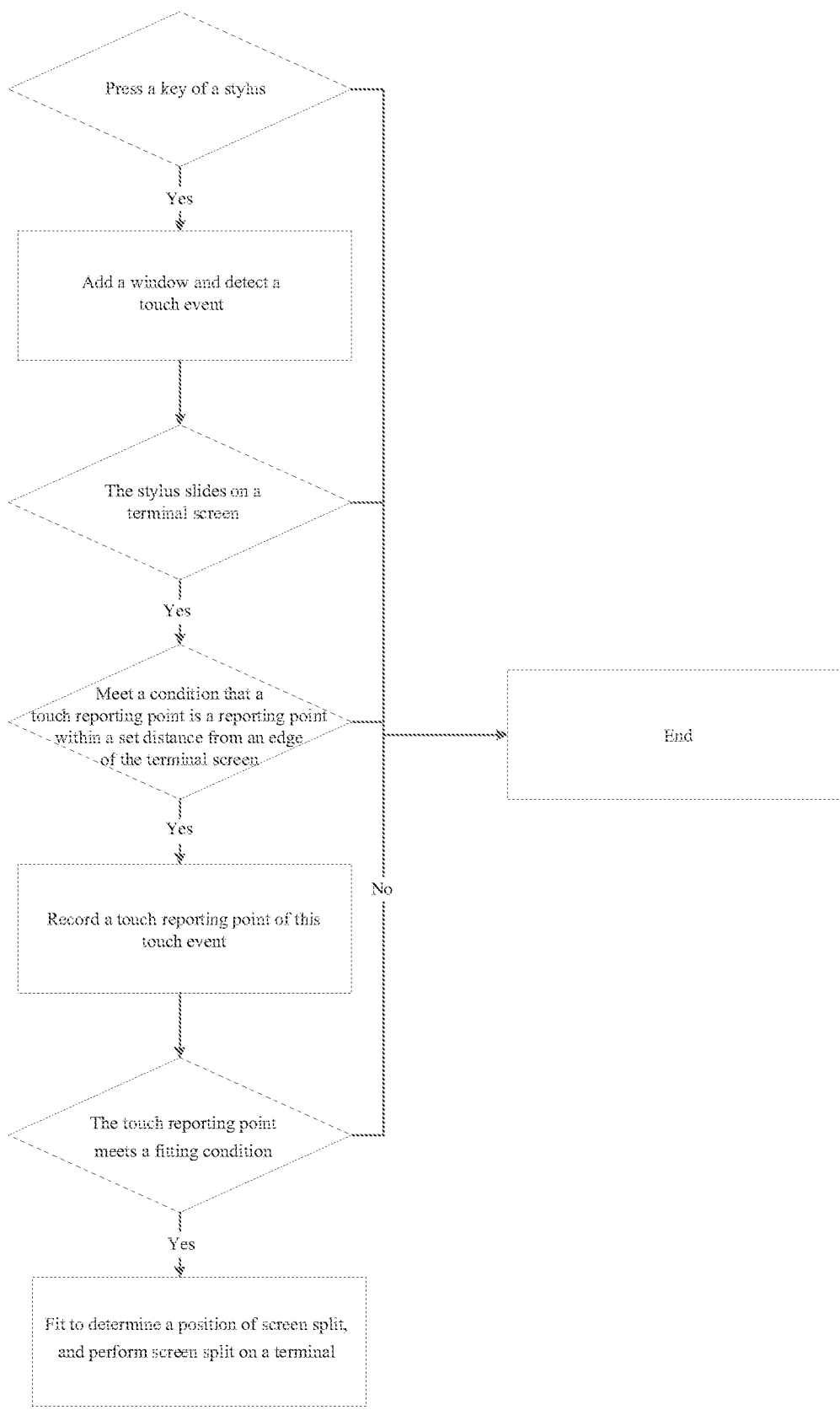
FIG. 7 is a flow diagram of a screen split control method shown according to an example.

FIG. 7 is a flow diagram of a screen split control method shown according to an example. As shown in FIG. 7, whether the key of the stylus is pressed is judged. If yes, the window is added, and the touch event is detected. If no, screen split control is ended. Whether the stylus slides on the terminal screen is judged. If yes, and the start touch reporting point being within the set distance from the edge of the terminal screen is met, the touch reporting point of this touch event is recorded and screened. The screened touch reporting points are determined to meet the fitting condition and are fit. The fitting straight line is taken as the screen split position, and the terminal performs screen split according to the screen split position. Through the screen split control method provided by the example of the disclosure. Mistaken touch can be reduced, an animation effect is added, the user experience is improved, the global system monitoring event (such as gesture monitoring) is reduced, system power consumption is reduced, and thus the system stability is improved.

Figure 8A:
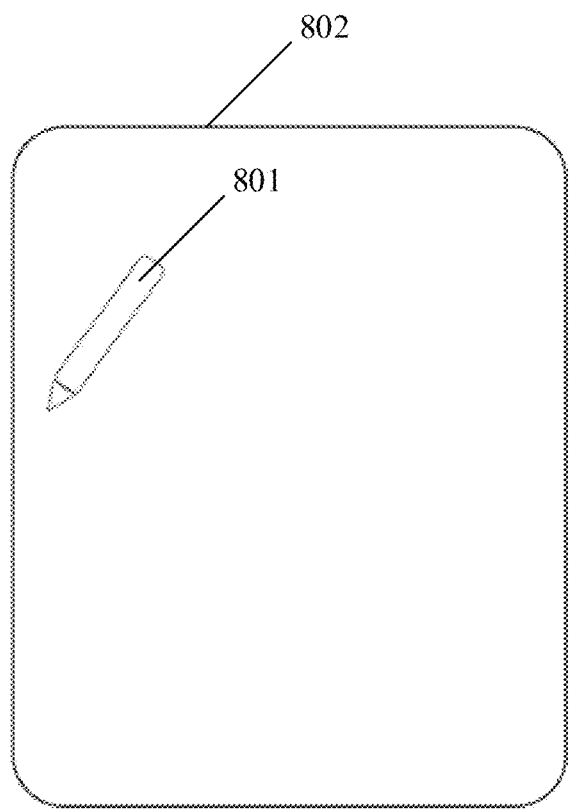
FIG. 8A, FIG. 8B and FIG. 8C are flow diagrams of a screen split control method shown according to an example.
Figure 8B:
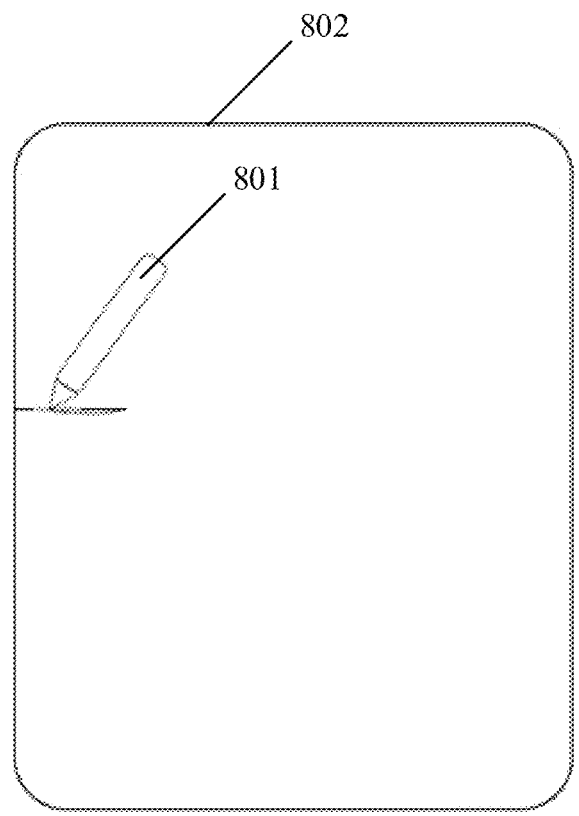
Figure 8C:
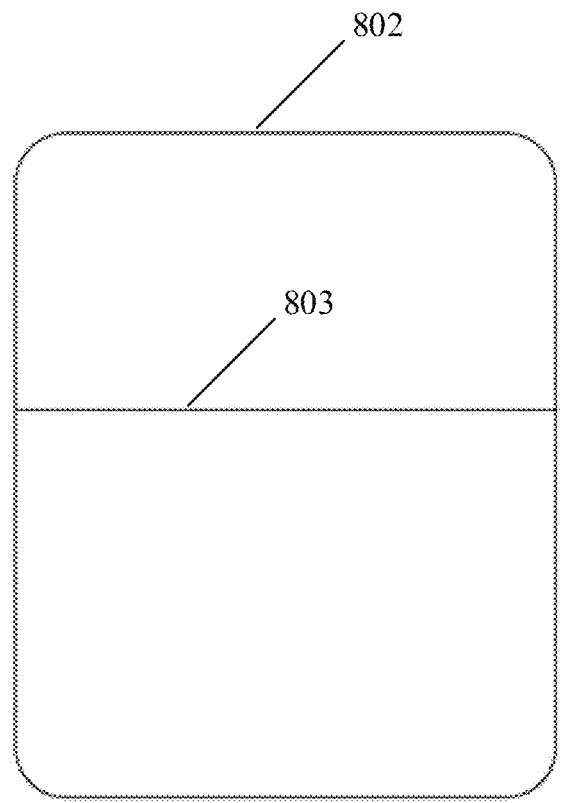

FIG. 8A, FIG. 8B and FIG. 8C are flow diagrams of the screen split control method shown according to an example. As shown in FIG. 8A, the stylus 801 triggers the touch event of the terminal 802 and records the current touch reporting point as the start touch reporting point. As shown in FIG. 8B, taking left-right linear sliding of the stylus 801 on the terminal 802 as an example, the stylus 801 performs the sliding operation event on the terminal screen to trigger the screen split control of the terminal, the screen split position is generated according to the sliding track of the stylus 801 on the terminal screen, it is determined as up-down screen split, and the animation matching the screen split position 803 is displayed at the screen split position. As shown in FIG. 8C, it is a schematic diagram for the terminal to perform up-down screen split according to the sliding track of the stylus 801.

It may be understood that when the stylus 801 performs the sliding operation on the terminal screen, the screen split position of the terminal 802 is the sliding track of the stylus 801, and screen split may be performed by taking any touch reporting point on the terminal screen meeting the fitting condition as the start touch reporting point.

Figure 9A:
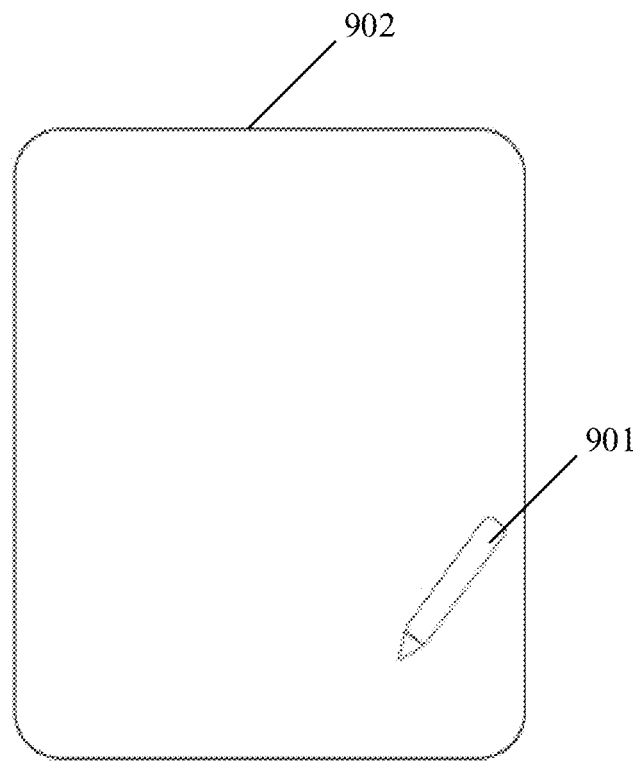
FIG. 9A, FIG. 9B and FIG. 9C are schematic diagrams of a screen split control method shown according to an example.
Figure 9B:
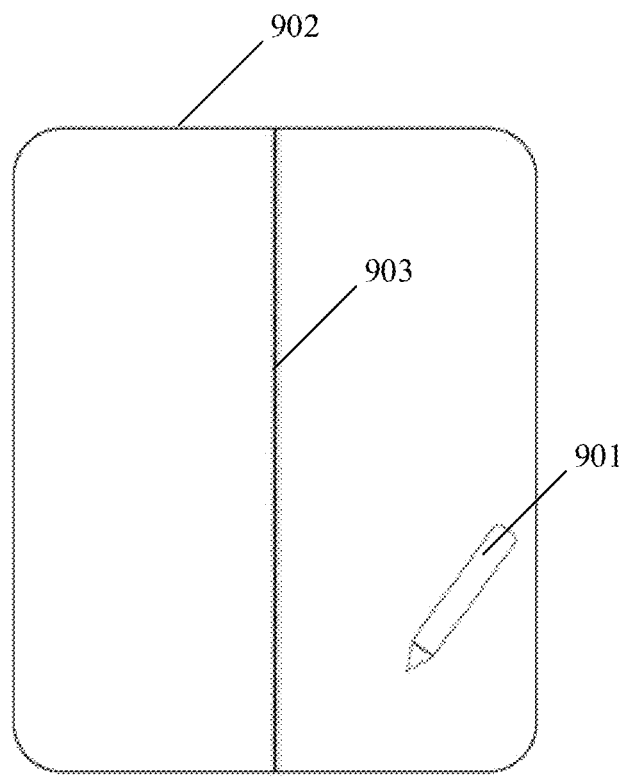
Figure 9C:
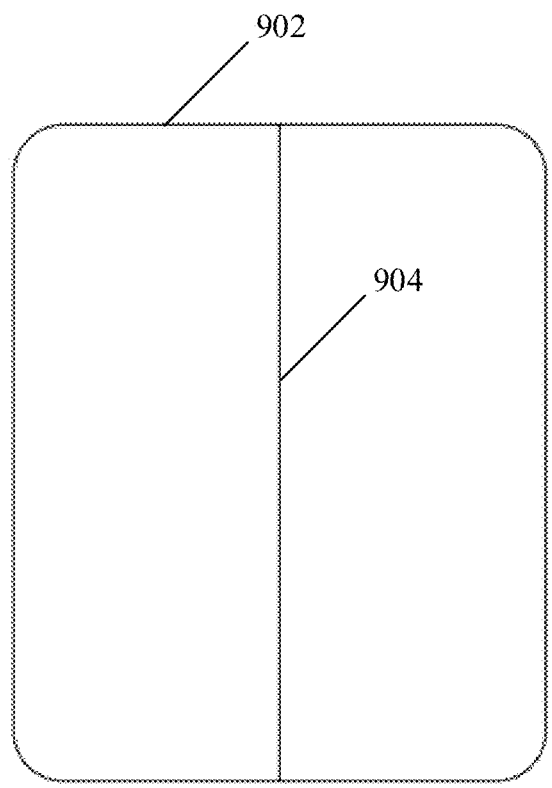

FIG. 9A, FIG. 9B and FIG. 9C are schematic diagrams of the screen split control method shown according to an example. As shown in FIG. 9A, the stylus 901 triggers the touch event of the terminal 902 and records the current touch reporting point. As shown in FIG. 9B, taking the touch reporting point being at the lower right and the lower right touch area corresponding to the left-right screen split as an example, the terminal determines that the current touch reporting point corresponds to the left-right screen split according to the current touch area corresponding to the current touch reporting point and the relationship between the touch area and the screen split position, then the terminal screen is subjected to the left-right screen split operation, and the animation 903 matching the screen split position is displayed at the screen split position. As shown in FIG. 9C, it is a schematic diagram for the terminal 902 to complete the screen split operation according to the relationship between the touch area where the touch reporting point is located and the screen split position 904.

Based on the same concept, an example of the disclosure further provides a screen split control apparatus.

It may be understood that, in order to implement the above functions, the screen split control apparatus provided by the example of the disclosure contains corresponding hardware structures and/or software modules for executing all the functions. Combining with units and algorithm steps of each example disclosed in the example of the disclosure, the example of the disclosure can be implemented in a form of hardware or a combination of hardware and computer software. Whether a certain function is executed in a mode of hardware or a mode of the hardware driven by the computer software depends on a specific application and design constraint conditions of the technical solution. Those skilled in the art may use different methods to implement the described functions for each specific application, but such implementation should not be regarded beyond the scope of the technical solution of the example of the disclosure.

Figure 10:
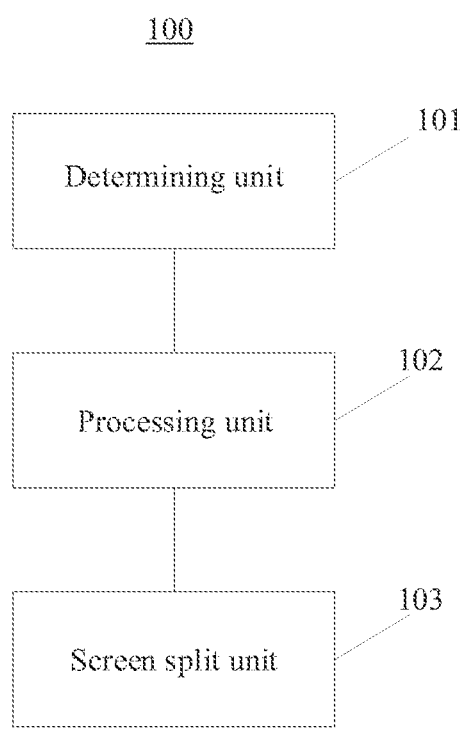
FIG. 10 is a block diagram of a screen split control apparatus shown according to an example.

FIG. 10 is a block diagram of a screen split control apparatus shown according to an example. Referring to FIG. 10, the screen split control apparatus 100 includes a determining unit 101, a processing unit 102, and a screen split unit 103.

The determining unit 101 is configured to determine, in a case of receiving a control instruction triggered by a stylus, that the control instruction is a control instruction of triggering screen split and create a window, where the window is configured to intercept a non-stylus touch event and detect a stylus touch event.

The processing unit 102 is configured to determine a screen split position of the terminal based on the stylus touch event detected by the window.

The screen split unit 103 is configured to perform screen split on the terminal based on the screen split position.

In one implementation, the stylus includes a key, and the determining unit 101 determines that the control instruction is the control instruction of triggering screen split in the following modes:
  caching, in response to detecting a control instruction of pressing the key, the control instruction of pressing the key, and suppressing reporting of the control instruction;
  monitoring a duration of pressing the key; and
  determining, in response to determining the duration is greater than a preset duration, that a control instruction of pressing the key for a long time is detected, and determining the control instruction of pressing the key for a long time as the control instruction of triggering screen split.

In one implementation, the determining unit 101 determines the screen split position of the terminal based on the stylus touch event detected by the window in the following modes:
  recording, in response to detecting the stylus touch event based on the window, a touch reporting point corresponding to the stylus touch event; and
  determining the screen split position of the terminal based on the touch reporting point.

In one implementation, the determining unit 101 determines the screen split position of the terminal based on the touch reporting point in the following modes:
  recording, in response to that the stylus touch event is a sliding operation event, all touch reporting points starting from a start touch reporting point to detection of an end touch reporting point;
  fitting a sliding track of the stylus on the terminal as a straight line based on the recorded touch reporting points; and
  determining a position of the straight line as the screen split position of the terminal.

In one implementation, the determining unit 101 fits the sliding track of the stylus on the terminal as the straight line based on the recorded touch reporting points in the following modes:
  screening a touch reporting point meeting a fitting condition among the recorded touch reporting points, where the touch reporting point meeting the fitting condition includes that an absolute value of a difference value between a first target coordinate and a first target coordinate of the start touch reporting point is less than a threshold value, and a second target coordinate and a second target coordinate of the start touch reporting point meet an increasing or decreasing change relationship;
  where, the first target coordinate is an abscissa, the second target coordinate is an ordinate, or the first target coordinate is the ordinate, and the second target coordinate is the abscissa; and
  fitting the sliding track of the stylus on the terminal as the straight line based on the touch reporting point meeting the fitting condition.

In one implementation, the start touch reporting point is a reporting point within a set distance from an edge of a terminal screen.

In one implementation, the determining unit 101 determines the screen split position of the terminal based on the touch reporting point and is further configured to:
  determine, in response to the stylus touch event as a touch operation, a current touch area corresponding to the touch reporting point; and
  determine a screen split position corresponding to the current touch area based on a relationship between the current touch area and the screen split position.

In one implementation, the screen split position includes a screen split position for up-down screen split, and/or a screen split position for left-right screen split.

In one implementation, the determining unit 101 is further configured to: prohibit a function corresponding to the control instruction of pressing the key from being triggered.

In one implementation, the processing unit 102 is further configured to: remove the window in response to detecting a control instruction of non-triggering screen split.

In one implementation, the processing unit 102 is further configured to: display an animation matching the screen split position based on the screen split position.

Figure 11:
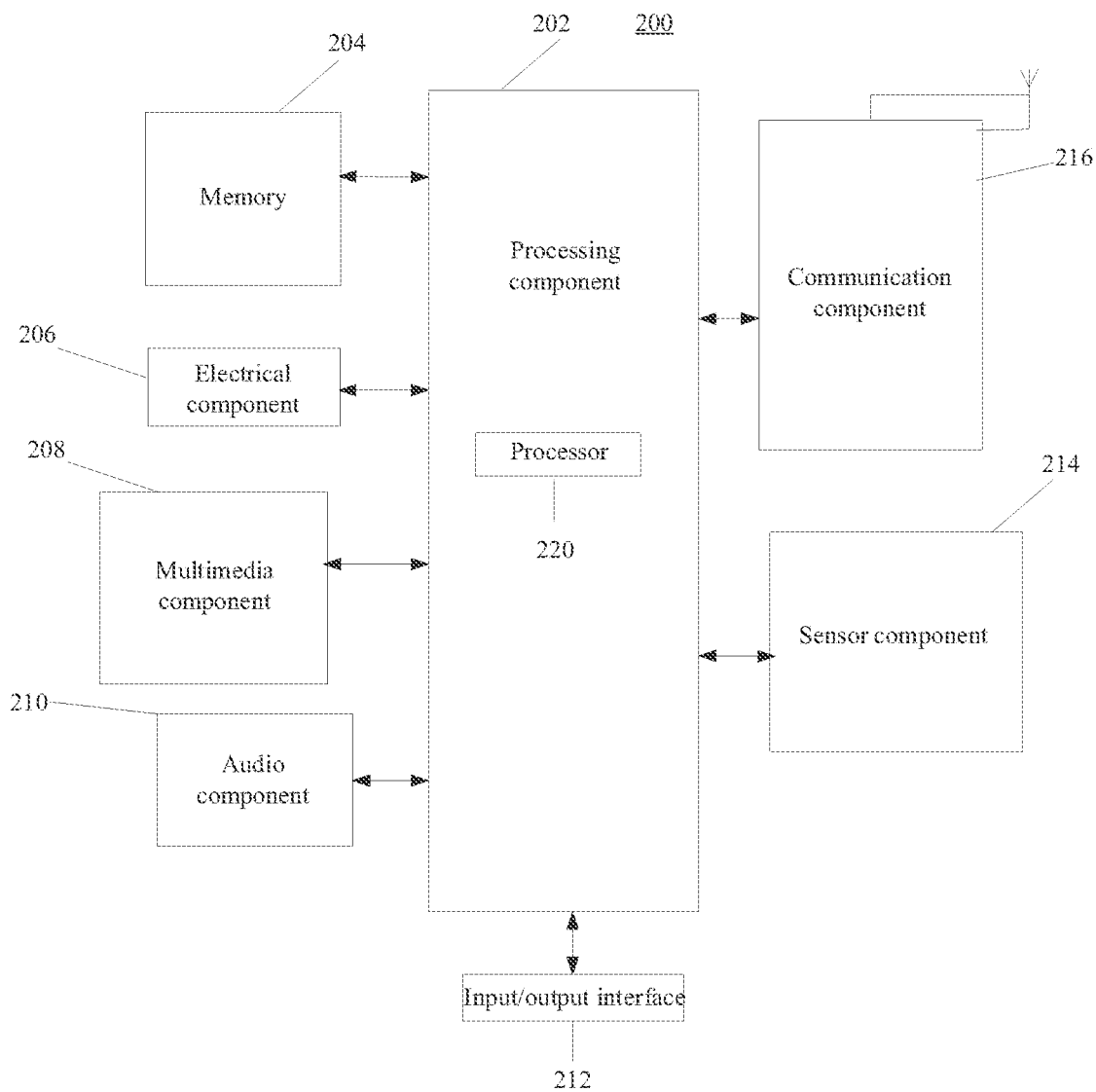
FIG. 11 is a block diagram of an apparatus for screen split control shown according to an example.

FIG. 11 is a block diagram of an apparatus 200 for screen split control shown according to an example. For example, the apparatus 200 may be a mobile telephone, a computer, a digital broadcast terminal, a message transceiving device, a game console, a tablet device, a medical device, a fitness device, a personal digital assistant, and the like.

Referring to FIG. 11, the apparatus 200 may include one or more of the following components: a processing component 202, a memory 204, an electrical component 206, a multimedia component 208, an audio component 210, an input/output (I/O) interface 212, a sensor component 214, and a communication component 216.

The processing component 202 usually controls overall operation of the apparatus 200, such as operations associated with displaying, telephone calling, data communication, a camera operation and a record operation. The processing component 202 may include one or more processors 220 to execute an instruction, so as to complete all or part of steps of the above method. In addition, the processing component 202 may include one or more modules, so as to facilitate interaction between the processing component 202 and other components. For example, the processing component 202 may include a multimedia module, so as to facilitate interaction between the multimedia component 208 and the processing component 202.

The memory 204 is configured to store various types of data so as to support operations on the apparatus 200. Examples of these data include instructions of any application program or method used to be operated on the apparatus 200, contact data, telephone directory data, messages, pictures, videos, and the like. The memory 204 may be implemented by any type of volatile or nonvolatile storage devices or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 206 provides electric power for various components of the apparatus 200. The electrical component 206 may include a power management system, one or more power sources, and other components associated with generating, managing and distributing electric power for the apparatus 200.

The multimedia component 208 includes a screen providing an output interface between the apparatus 200 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not merely sense a boundary of a touching or swiping action, but also detect duration and pressure related to the touching or swiping operation. In some examples, the multimedia component 208 includes a front camera and/or a back camera. When the apparatus 200 is in an operation mode, such as a shooting mode or a video mode, the front camera and/or the back camera may receive external multimedia data. Each front camera and each back camera may be a fixed optical lens system or have a focal length and optical zooming capability.

The audio component 210 is configured to output and/or input an audio signal. For example, the audio component 210 includes a microphone (MIC). When the apparatus 200 is in an operation mode, such as a call mode, a recording mode or a speech recognition mode, the microphone is configured to receive an external audio signal. The received audio signal may be further stored in the memory 204 or sent via the communication component 216. In some examples, the audio component 210 further includes a speaker for outputting the audio signal.

The I/O interface 212 provides an interface between the processing component 202 and a peripheral interface module, and the above peripheral interface module may be a keyboard, a click wheel, buttons, etc. These buttons may include, but not limited to: a home button, a volume button, a start button and a lock button.

The sensor component 214 includes one or more sensors for providing state evaluations of all aspects for the apparatus 200. For example, the sensor component 214 may detect an on/off state of the apparatus 200 and relative positioning of components, for example, the components are a display and a keypad of the apparatus 200. The sensor component 214 may further detect position change of the apparatus 200 or one component of the apparatus 200, whether there is contact between the user and the apparatus 200, azimuth or acceleration/deceleration of the apparatus 200, and temperature change of the apparatus 200. The sensor component 214 may include a proximity sensor, which is configured to detect existence of a nearby object without any physical contact. The sensor component 214 may further include an optical sensor, such as a CMOS or CCD image sensor, for use in an imaging application. In some examples, the sensor component 214 may further include an acceleration sensor, a gyroscope sensor, a magnetic sensor, a pressure sensor or a temperature sensor.

The communication component 216 is configured to facilitate wired or wireless communication between the apparatus 200 and other devices. The apparatus 200 may access a wireless network based on a communication standard, such as WiFi, 2G or 3G, or their combination. In one example, the communication component 216 receives a broadcast signal or broadcast related information from an external broadcast management system via a broadcast channel. In one example, the communication component 216 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the apparatus 200 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In the example, a non-transitory computer readable storage medium including instructions is further provided, such as a memory 204 including instructions. The above instructions may be executed by a processor 220 of the apparatus 200 so as to complete the above method. For example, the non-transitory computer readable storage medium may be an ROM, a random access memory (RAM), a CD-ROM, a magnetic tape, a floppy disk, an optical data storage device and the like.

It can be understood that in the disclosure, "plurality of" refers to two or more than two, and other quantifiers are similar. "And/or" describes an association relationship of an association object, and represents that there may be three kinds of relationships, for example, A and/or B, may represent three cases: A exists alone, A and B exist at the same time, and B exists alone. A character "/" generally represents that the previous and next association objects are in an "or" relationship. The singular forms "a", "the" and "this" are intended to include the plural forms as well, unless the context clearly indicates otherwise.

It can be further understood that the terms "first", "second" and the like are used to describe various information, but these information should not be limited to these terms. These terms are merely configured to distinguish the same type of information from one another, and do not imply a particular order or a level of importance. In fact, the expressions "first", "second" and the like may be used completely interchangeably. For example, in a case of not departing from the scope of the disclosure, first information may also be called second information, and similarly, the second information may also be called the first information. It can be further understood that, unless otherwise specified specially, "connection" includes direct connections between the two without other components and indirect connection between the two with other elements.

It may be further understood that in the examples of the disclosure, although the operations are described in a specific order in the accompanying drawings, it should not be construed as requiring that the operations are executed in the specific order shown or a serial order, or that all the operations shown are executed to obtain desired results. In a certain circumstance, multitasking and parallel processing may be advantageous.

Those of skill in the art will easily figure out other implementation solutions of the disclosure after considering the specification and practicing the disclosure here. The disclosure intends to cover any transformation, usage or adaptive change of the disclosure, and these transformations, usages or adaptive changes conform to a general principle of the disclosure and include common general knowledge or conventional technical means in the technical field not disclosed by the disclosure.

It needs to be understood that the disclosure is not limited to the exact structure that has been described above and shown in the accompanying drawings, and that various modifications and changes may be made without departing from the scope of the disclosure. The scope of the disclosure is limited merely by the scope of the appended claim.

What is claimed is:

1. A screen split control method, performed by a terminal, wherein the terminal has a function of responding to a control instruction triggered by a stylus, and the screen split control method comprises:
    creating a window in response to receiving the control instruction triggered by the stylus and determining that the control instruction is a control instruction of triggering screen split, wherein the window is configured to intercept a non-stylus touch event and detect a stylus touch event;
    recording, in response to detecting the stylus touch event based on the window, touch reporting points corresponding to the stylus touch event, wherein the stylus touch event is a sliding operation event and the touch reporting points comprises all touch reporting points starting from a start touch reporting point to detection of an end touch reporting point;
    screening a touch reporting point meeting a fitting condition among the recorded touch reporting points, wherein the touch reporting point meeting the fitting condition comprises that an absolute value of a difference value between a first target coordinate and a first target coordinate of the start touch reporting point is less than a threshold value, and a second target coordinate and a second target coordinate of the start touch reporting point meet an increasing or decreasing change relationship;
    wherein the first target coordinate is an abscissa, the second target coordinate is an ordinate, or the first target coordinate is the ordinate, and the second target coordinate is the abscissa;
    fitting the sliding track of the stylus on the terminal as the straight line based on the touch reporting point meeting the fitting condition;
    determining a position of the straight line as the screen split position of the terminal; and
    performing screen split on the terminal based on the screen split position.

2. The screen split control method according to claim 1, wherein the stylus comprises a key, and determining that the control instruction is the control instruction of triggering screen split comprises:
    caching, in response to detecting a control instruction of pressing the key, the control instruction of pressing the key, and suppressing reporting of the control instruction;
    monitoring a duration of pressing the key; and
    determining, in response to determining that the duration is greater than a preset duration, that a control instruction of pressing the key for a long time is detected, and determining the control instruction of pressing the key for a long time as the control instruction of triggering screen split.

3. The screen split control method according to claim 1, wherein the start touch reporting point is a reporting point within a set distance from an edge of a terminal screen.

4. The screen split control method according to claim 1, wherein the screen split position comprises at least one of: a screen split position for up-down screen split and a screen split position for left-right screen split.

5. The screen split control method according to claim 2, further comprising:
    prohibiting a function corresponding to the control instruction of pressing the key from being triggered.

6. The screen split control method according to claim 1, further comprising:
    removing the window in response to detecting a control instruction of non-triggering screen split.

7. The screen split control method according to claim 1, further comprising:
    displaying an animation matching the screen split position based on the screen split position.

8. A screen split control apparatus, comprising:
    a processor; and
    a memory for storing processor executable instructions;
    wherein
    the processor, when executing the instructions, is configured to:
        create a window in response to receiving a control instruction triggered by a stylus and determining that the control instruction is a control instruction of triggering screen split, wherein the window is configured to intercept a non-stylus touch event and detect a stylus touch event;
        determine a screen split position of a terminal based on the stylus touch event detected by the window;
        perform screen split on the terminal based on the screen split position;
        record, in response to detecting the stylus touch event based on the window, touch reporting points corresponding to the stylus touch event, wherein the stylus touch event is a sliding operation event and the touch reporting points comprises all touch reporting points starting from a start touch reporting point to detection of an end touch reporting point;
        screen a touch reporting point meeting a fitting condition among the recorded touch reporting points, wherein the touch reporting point meeting the fitting condition comprises that an absolute value of a difference value between a first target coordinate and a first target coordinate of the start touch reporting point is less than a threshold value, and a second target coordinate and a second target coordinate of the start touch reporting point meet an increasing or decreasing change relationship;
        wherein the first target coordinate is an abscissa, the second target coordinate is an ordinate, or the first target coordinate is the ordinate, and the second target coordinate is the abscissa;
        fit the sliding track of the stylus on the terminal as the straight line based on the touch reporting point meeting the fitting condition; and
        determine a position of the straight line as the screen split position of the terminal.

9. The screen split control apparatus according to claim 8, wherein the stylus comprises a key, and the processor, when executing the instructions, is further configured to:

cache, in response to detecting a control instruction of pressing the key, the control instruction of pressing the key, and suppress reporting of the control instruction;

monitor a duration of pressing the key; and determine, in response to determining that the duration is greater than a preset duration, that a control instruction of pressing the key for a long time is detected, and determine the control instruction of pressing the key for a long time as the control instruction of triggering screen split.

10. The screen split control apparatus according to claim 8, wherein the start touch reporting point is a reporting point within a set distance from an edge of a terminal screen.

11. The screen split control apparatus according to claim 8, wherein the screen split position comprises at least one of: a screen split position for up-down screen split and a screen split position for left-right screen split.

12. A non-transitory computer readable storage medium, wherein the storage medium stores instructions, and the instructions in the storage medium, when executed by a processor of a terminal, cause the terminal to:

create a window in response to receiving a control instruction triggered by a stylus and determining that the control instruction is a control instruction of triggering screen split, wherein the window is configured to intercept a non-stylus touch event and detect a stylus touch event;

record, in response to detecting the stylus touch event based on the window, touch reporting points corresponding to the stylus touch event, wherein the stylus touch event is a sliding operation event and the touch reporting points comprises all touch reporting points starting from a start touch reporting point to detection of an end touch reporting point;

screen a touch reporting point meeting a fitting condition among the recorded touch reporting points, wherein the touch reporting point meeting the fitting condition comprises that an absolute value of a difference value between a first target coordinate and a first target coordinate of the start touch reporting point is less than a threshold value, and a second target coordinate and a second target coordinate of the start touch reporting point meet an increasing or decreasing change relationship;

wherein the first target coordinate is an abscissa, the second target coordinate is an ordinate, or the first target coordinate is the ordinate, and the second target coordinate is the abscissa;

fit the sliding track of the stylus on the terminal as the straight line based on the touch reporting point meeting the fitting condition;

determine a position of the straight line as the screen split position of the terminal; and perform screen split on the terminal based on the screen split position.

\* \* \* \* \*